United States Patent
Lee (10) Patent No.: US 9,100,456 B2
(45) Date of Patent: Aug. 4, 2015

(54) WAITING TICKET OPERATION SYSTEM AND METHOD

(71) Applicant: AQ Corporation, Suwon-Si, Gyeonggi-Do (KR)

(72) Inventor: Sang Hoon Lee, Suwon (KR)

(73) Assignee: AQ CORPORATION (KR)

( * ) Notice: Subject to any disclaimer, the term of this patent is extended or adjusted under 35 U.S.C. 154(b) by 0 days.

(21) Appl. No.: 14/009,062

(22) PCT Filed: Mar. 26, 2013

(86) PCT No.: PCT/KR2013/002478
§ 371 (c)(1),
(2) Date: Sep. 30, 2013

(87) PCT Pub. No.: WO2013/147484
PCT Pub. Date: Oct. 3, 2013

(65) Prior Publication Data
US 2015/0012580 A1    Jan. 8, 2015

(30) Foreign Application Priority Data
Mar. 26, 2012   (KR) .......................... 10-2012-0030598

(51) Int. Cl.
*G06F 15/16*       (2006.01)
*H04L 29/08*       (2006.01)
(Continued)

(52) U.S. Cl.
CPC .............. *H04L 67/325* (2013.01); *G06Q 10/06* (2013.01); *G06Q 30/016* (2013.01); *G06Q 30/02* (2013.01); *G06Q 30/0241* (2013.01); *H04B 5/00* (2013.01); *H04L 63/10* (2013.01); *H04L 67/10* (2013.01)

(58) Field of Classification Search
USPC ........................................................ 709/201
See application file for complete search history.

(56) References Cited

U.S. PATENT DOCUMENTS

2007/0140222 A1 *   6/2007   Kowalczyk ................... 370/352
2008/0167106 A1 *   7/2008   Lutnick et al. .................. 463/16
(Continued)

FOREIGN PATENT DOCUMENTS

KR       10-2005-0017948 A      2/2005
KR           10-0529789 B1     11/2005
(Continued)

OTHER PUBLICATIONS

Office action from the Korean Intellectual Patent Office in Korean patent application 10-2012-0030598.
(Continued)

*Primary Examiner* — Richard G Keehn
(74) *Attorney, Agent, or Firm* — Knobbe Martens Olson & Bear LLP (57) ABSTRACT

Provided is a waiting ticket operating system, comprising a user NFC terminal for storing and displaying waiting ticket information; a waiting ticket server for generating the waiting ticket information depending on the user NFC terminal's request and transmitting a waiting status to the user NFC terminal at regular intervals as the numerical order is updated; and a smart branch installed at a predetermined position and linked with the waiting ticket server to supply updated waiting ticket information, whereby it is advantageous that the number of a waiting ticket and the information about a waiting status are received and displayed in the user's mobile terminal, using a wireless communication network, so that the availability of the mobile terminal can be improved, and when a waiting time increases, other simple necessary affairs can be conducted, thereby enabling the user to conveniently use the mobile terminal.

18 Claims, 5 Drawing Sheets

(51) Int. Cl.
*G06Q 30/02* (2012.01)
*G06Q 10/06* (2012.01)
*H04L 29/06* (2006.01)
*H04B 5/00* (2006.01)
*G06Q 30/00* (2012.01)

(56) References Cited

U.S. PATENT DOCUMENTS

| | | | |
|---|---|---|---|
| 2009/0138586 A1* | 5/2009 | Maschio-Esposito et al. | 709/223 |
| 2010/0036690 A1* | 2/2010 | Chafle et al. | 705/7 |
| 2010/0211217 A1* | 8/2010 | Hirsh et al. | 700/234 |
| 2013/0117695 A1* | 5/2013 | Hammoud | 715/761 |
| 2013/0212017 A1* | 8/2013 | Bangia | 705/44 |
| 2014/0005825 A1* | 1/2014 | Maisto et al. | 700/236 |

FOREIGN PATENT DOCUMENTS

| KR | 10-2006-0016528 A | 2/2006 |
|---|---|---|
| KR | 20-0413326 Y1 | 4/2006 |
| KR | 10-2011-0075215 A | 7/2011 |

OTHER PUBLICATIONS

International Search Report dated Aug. 14, 2013 of PCT/KR2013/002478 which is the parent application—3 pages.
Office Action dated Aug. 7, 2012 of corresponding Korean Patent Application No. 10-2012-0030598—6 pages.

* cited by examiner

WAITING TICKET OPERATION SYSTEM AND METHOD

CROSS REFERENCE TO RELATED APPLICATION

The present application claims all benefits accruing under 35 U.S.C. §365(c) from the PCT International Application PCT/KR2013/002478, with an International Filing Date of Mar. 26, 2013, which claims the priority based on 10-2012-0030598 filed on Mar. 26, 2012, the entire contents of which are incorporated herein by reference.

BACKGROUND OF THE INVENTION

1. Field of the Invention

The present invention relates to a system for providing a waiting number ticket (hereinafter referred to as "a waiting ticket") for use with a mobile terminal in banks and the like. More specifically, a waiting ticket operation system that issues a waiting ticket and provides the waiting ticket to a mobile terminal so that business affairs can be carried out with order being maintained in public institutions such as banks, public offices, and the like.

2. Description of the Related Arts

A mobile communication system includes a mobile terminal and a mobile communication network. The mobile terminal includes equipment which enables the user to communicate with another desired party via wirelessly accessing the other desired party at any time and at any position, while freely moving within a service area formed by a network. The mobile terminal includes a mobile terminal for use within a vehicle and a portable mobile terminal. A portable tablet PC with the capabilities of a small PC has been recently developed. Thus, all equipment including PCs will be hereinafter referred to as "the mobile terminal."

The amount of time used for communication between two parties using mobile terminals is very small. Furthermore, since the communication has the characteristics of quickly and correctly transmitting important information while simultaneously generating information at any time and at any position, it is typical for a user to always carry the mobile terminal. Here, the communication will be referred to as a concept including voice communications, image communications, data communications, and the like.

Even though the mobile terminal is always carried by the user, the amount of time for which it is actually used for communication is small. Thus, various additional functions for efficiently utilizing the mobile terminal when it is not being used for communication, are additionally provided for in the mobile terminal.

Additional functions such as a camera, MP3 player, video recorder, scanner, game console, e-book reader, wireless internet capability, a computer, and the like are variously provided. New functions are continuously being developed and added. During the time when the mobile terminal is not used for communication, it is typical for the above mentioned additional functions to be used.

Also among these additional functions, an NFC (near field communication) type wireless communication technology is included. The NFC technology is used for transmitting and receiving data signals, via wirelessly accessing a reader or another party's mobile terminal, within ranges of about 10 cm. Also included is an RFID (Radio Frequency Identification) type wireless communication technology for transmitting and receiving data signals, via wirelessly accessing a reader, within ranges of several centimeters. Both of these functions have been developed and applied.

Since the NFC provides a way of enabling wireless communications within ranges of 10 cm, low amounts of electrical power are consumed. This characteristic allows the NFC to be operated in a card-mode for performing financial transactions, such as electronic payments using a credit card, in a P2P-mode for transmitting and receiving data signals via a one-to-one wireless connection, and in a read-mode for reading and confirming simple information.

The RFID can be operated in an m-commerce mode as it is generally applied to electronic settlements for commercial transactions.

Standard practice to maintain order and quickly and smoothly conduct businesses affairs at places like a bank or a public office, where people typically conduct business affairs, as well as other places where people gather to conduct other similar kinds of business (hereinafter referred to as "a public institution"), a waiting number ticket is issued. The ticket is made of paper with a serial number printed on it, and is distributed in the order of arrival allowing business affairs to be conducted in numerical order, corresponding to the number displayed on the waiting tickets.

Herein, when the number provided on the waiting ticket is displayed on a relevant electronic quotation board or the like, the user having the waiting ticket corresponding to the displayed number, submits the waiting ticket and proceeds with his or her relevant business affairs.

In the conventional system, it is difficult and inconvenient for the user to move to other locations or conduct other business affairs whilst securing a waiting number ticket for use, followed by watching the relevant electronic quotation board to confirm whether or not the number provided on his or her waiting ticket is being displayed.

Furthermore, high maintenance and management costs of consumable supplies (i.e., paper, ink, and the like) are associated with paper-based waiting number tickets.

Accordingly, there is considerable need for the development of an electronic waiting number ticket (a waiting ticket) technology. Electronic distribution of a waiting ticket using a mobile terminal, NFC, or RFID will allow other necessary affairs to be conducted while waiting. This technology will also lower maintenance and management costs compared to paper-based waiting tickets.

SUMMARY

In one embodiment, the present invention provides a waiting ticket operation system in which the user is issued an electronic waiting ticket (a waiting ticket) for use with the user's mobile terminal so that the user can confirm information such as a waiting ticket number, including an expected wait-time, and the like, and can concomitantly move to alternate locations while waiting, if necessary.

In another embodiment, the present invention provides a waiting ticket operation system in which an electronic waiting number ticket (a waiting ticket) is provided to the user's mobile terminal, using a wireless communication network, so that low maintenance and repair costs for issuing the waiting ticket can be realized.

In still yet another embodiment, the present invention provides a waiting ticket operation system whereby when a waiting ticket is provided, advertising information is also transmitted allowing useful promotional features to be realized.

In one aspect of the present invention, a waiting ticket operating system is provided, including: a user NFC terminal for storing and displaying waiting ticket information; a waiting ticket server for generating the waiting ticket information (i.e., depending on the user NFC terminal's request), and transmitting a waiting status to the user NFC terminal at regular intervals while the waiting ticket's numerical order is updated; a smart branch installed at a predetermined position, linked with the waiting ticket server, to supply updated waiting ticket information, wherein the user NFC terminal transmits the stored waiting ticket information to the smart branch, and the smart branch receives the updated waiting ticket information through the waiting ticket server and transmits it to the user NFC terminal.

Within the waiting ticket operation system, according to one embodiment of the present invention, the user NFC terminal may include: a waiting ticket information processing unit for extracting a waiting ticket from the waiting ticket information transmitted from the waiting ticket server and storing it in a terminal database unit; and a terminal control unit for displaying contents of the waiting ticket stored in the terminal database unit.

Within the waiting ticket operation system, according to another embodiment of the present invention, the waiting ticket server may include: a waiting ticket generating unit for sequentially issuing a waiting number and updating the issued waiting number; a waiting ticket information verifying unit for confirming whether the waiting ticket information, transmitted from the user NFC terminal to the smart branch, is useful information or not; and a waiting ticket controlling unit for collecting terminal information from the NFC terminal, analyzing the information, then transmitting the updated waiting ticket information to the user NFC terminal that corresponds to the terminal information.

Within the waiting ticket operation system, according to yet another embodiment of the present invention, the smart branch may include: a processing unit linked with a separate financial server to provide financial services; a waiting ticket information processing unit for receiving the waiting ticket information, receiving terminal information transmitted from the user NFC terminal, and requesting the updated waiting ticket information by providing terminal information to the waiting ticket server; a branch control unit for providing updated waiting ticket information to the user NFC terminal.

Within the waiting ticket operation system, according to one embodiment of the present invention, the smart branch may further include a branch tag for storing smart branch information and accessing the information of the waiting ticket server, wherein the smart branch information and the access information of the waiting ticket server is provided to the user NFC terminal depending on the tagging of the user NFC terminal, and whereby the user NFC terminal accesses the waiting ticket server depending on the access information of the waiting ticket and requests the waiting ticket server to issue a waiting ticket corresponding to the smart branch information.

In another aspect of the present invention, a waiting ticket operating system can include a user NFC terminal for storing and displaying waiting ticket information; a waiting ticket server for generating waiting ticket information depending on the user NFC terminal's request, and transmitting a waiting status to the user NFC terminal at regular intervals while the waiting ticket's numerical order is updated; and an advertisement server for generating advertisement information along with the updated waiting ticket information, wherein the advertisement server receives both the updated waiting ticket information from the waiting ticket server, and terminal information of the user NFC terminal, and transmits the generated advertisement information to the user NFC terminal.

Within the waiting ticket operation system, according to one embodiment of the present invention, the user NFC terminal may include an advertisement information processing unit for extracting advertisement data by analyzing advertisement information, processing the advertisement data in a form that can be printed out on the user NFC terminal, and thereby storing it in a terminal database unit; a waiting ticket information processing unit for extracting a waiting ticket from the waiting ticket information transmitted from the waiting ticket server or the waiting advertisement information, and storing it in the terminal database unit; and a terminal control unit for displaying contents of the waiting ticket and the advertisement data stored in the terminal database unit.

Within the waiting ticket operation system, according to another embodiment of the present invention, the waiting ticket server may include a waiting ticket information generating unit for sequentially issuing a waiting number and updating the issued waiting number; a waiting ticket information verifying unit for confirming whether the waiting ticket information transmitted from the user NFC terminal to the smart branch is useful information or not; and a waiting ticket controlling unit for collecting terminal information from the NFC terminal, analyzing the terminal information, transmitting updated waiting ticket information, as well as transmitting terminal information to the advertisement server.

In yet another embodiment of the waiting ticket operation system, the advertisement server may include an advertisement control unit for analyzing positional information of the user NFC terminal from terminal information; and an advertisement information generating unit for searching advertisement information corresponding to positional information from the advertisement database, and generating waiting advertisement information including updated waiting ticket information and advertisement information.

In yet another aspect of the present invention, provided is a waiting ticket operation system including: a user NFC terminal for storing and displaying waiting ticket information; a waiting ticket server for generating the waiting ticket information (i.e., depending on the user NFC terminal's request), and transmitting a waiting status to the user NFC terminal at regular intervals while the waiting ticket's numerical order is updated; a smart branch installed at a predetermined position, linked with the waiting ticket server, to supply updated waiting ticket information; and an advertisement server for generating waiting advertisement information including updated waiting ticket information and advertisement information, wherein the user NFC terminal transmits the stored waiting ticket information to the smart branch, and the advertisement server transmits the waiting advertisement information, generated by receiving the updated waiting ticket information, from the waiting ticket server and the terminal information of the user NFC terminal.

In the waiting ticket operation system according to still another embodiment of the present invention, the smart branch may include a finance processing unit linked with a separate financial server for providing financial services; and a waiting ticket information processing unit for receiving the waiting ticket information and terminal information transmitted from the user NFC terminal, and providing the terminal information to the waiting ticket server.

According to yet another aspect of the present invention, provided is a waiting ticket operation method, including: a step in which a user NFC terminal requests a waiting ticket server to issue a waiting ticket and to transmit the requested waiting ticket information; a step in which the user NFC terminal analyzes the transmitted waiting ticket information, then extracts and stores the waiting ticket; a step in which the user NFC terminal transmits the waiting ticket information and terminal information to a smart branch; a step in which the smart branch requests the updated information of the waiting ticket information corresponding to the terminal information to the waiting ticket server, and receives the information; and a step in which the smart branch provides the updated waiting ticket to the user NFC terminal.

In another aspect embodiment of the present invention, a waiting ticket operation method is provided, including: a step in which a user NFC terminal requests a waiting ticket server to issue a waiting ticket and transmits the resulting waiting ticket information; a step in which the user NFC terminal analyzes the transmitted waiting ticket information, extracting a waiting ticket and storing the waiting ticket; a step in which a waiting ticket's position, in numerical order, is updated in the waiting ticket server; a step whereby the waiting ticket server transmits updated waiting ticket information and the terminal information of the user NFC terminal to an advertisement server, and requests the advertisement server to transmit waiting advertisement information; a step in which the advertisement server generates the waiting advertisement information and transmits the waiting advertisement information to the user NFC terminal; and a step in which the user NFC terminal analyzes the transmitted waiting advertisement information, then extracts and displays the updated waiting ticket information along with the advertisement information.

The waiting ticket operation method according to yet another embodiment of the present invention, may further include a step in which the advertisement server generates waiting advertisement information and transmits the waiting advertisement information to the user NFC terminal; a step in which the advertisement server analyzes the terminal information and finds the corresponding terminal positional information; and a step in which the advertisement server sends advertisement information corresponding to positional information from a database, and generates waiting advertisement information.

In another embodiment, a waiting ticket operation method is provided, including: a step in which a user NFC terminal requests a waiting ticket server to issue a waiting ticket and transmits the resulting waiting ticket information; a step in which the user NFC terminal analyzes the transmitted waiting ticket information and extracts a waiting ticket and storing the waiting ticket; a step which the user NFC terminal transmits the waiting ticket information and terminal information to a smart branch; a step in which the smart branch requests the waiting ticket server to check updated waiting ticket information corresponding to terminal information; a step in which the waiting ticket server transmits the updated waiting ticket information and terminal information of the user NFC terminal, to an advertisement server and requests the advertisement server to transmit waiting advertisement information; a step in which the advertisement server generates the waiting advertisement information and transmits the waiting advertisement information to the user NFC terminal; a step in which the user NFC terminal analyzes the transmitted waiting advertisement information, then extracts and displays the updated waiting ticket information and advertisement information.

According to the present invention, there are advantages to having the number of a waiting ticket and information about wait-status received and displayed on the user's mobile terminal using a wireless communication network, in that the availability, convenience, and efficiency of the mobile terminal can be improved. Similarly, when wait-time increases, other simple necessary affairs can be taken care of, thereby enabling the user to conveniently and efficiently use the mobile terminal.

There are also advantages to having waiting ticket information and advertisement information transmitted together to the mobile terminal, so that an efficient communication of advertisements can be disseminated, and paper is not being used, thereby protecting the environment.

DETAILED DESCRIPTION

Hereinafter, the preferred embodiment of the present invention will be described in detail with reference to the accompanying drawings. Terminology or words used in the description and claims of the present invention should not be interpreted as being limited merely to their common or dictionary meanings. Instead, they should be interpreted based on the meaning(s) and concept(s) of the invention, keeping within the scope of the invention based on the principle that the inventor(s) can appropriately define the terms in order to describe the invention in the best possible manner. In the following description, it is to be noted that when the functions of conventional elements, and the detailed description of elements, related to the present invention makes the gist of the present invention unclear, a detailed description of those elements will be omitted.

Services in the description of the present invention are referred to as services provided in various locations including, but not limited to, a store, bank, department store, public office, restaurant, hotel, passport issuance institution, and the like; and are referred to as concepts including all kinds of services provided at a cost or free, including but not limited to, financial transactions, barter, electronic payment, document issuance, certificate issuance, confirmation issuance, passport issuance, purchase of goods, counseling, and the like.

Furthermore, tagging is referred to as a state of being reseparated, after being in contact, following an initial state of being separated. Application ID (AID) is referred to as having a unique number for distinguishing each applet from a state of plurality of applets, which are application programs, as provided.

Figure 1:
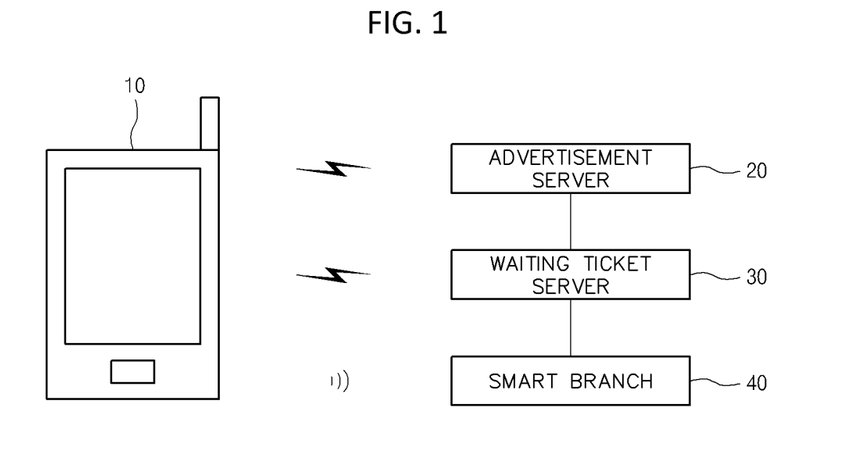
FIG. 1 is a view illustrating a waiting ticket operation system according to one embodiment of the present invention.
Figure 2:
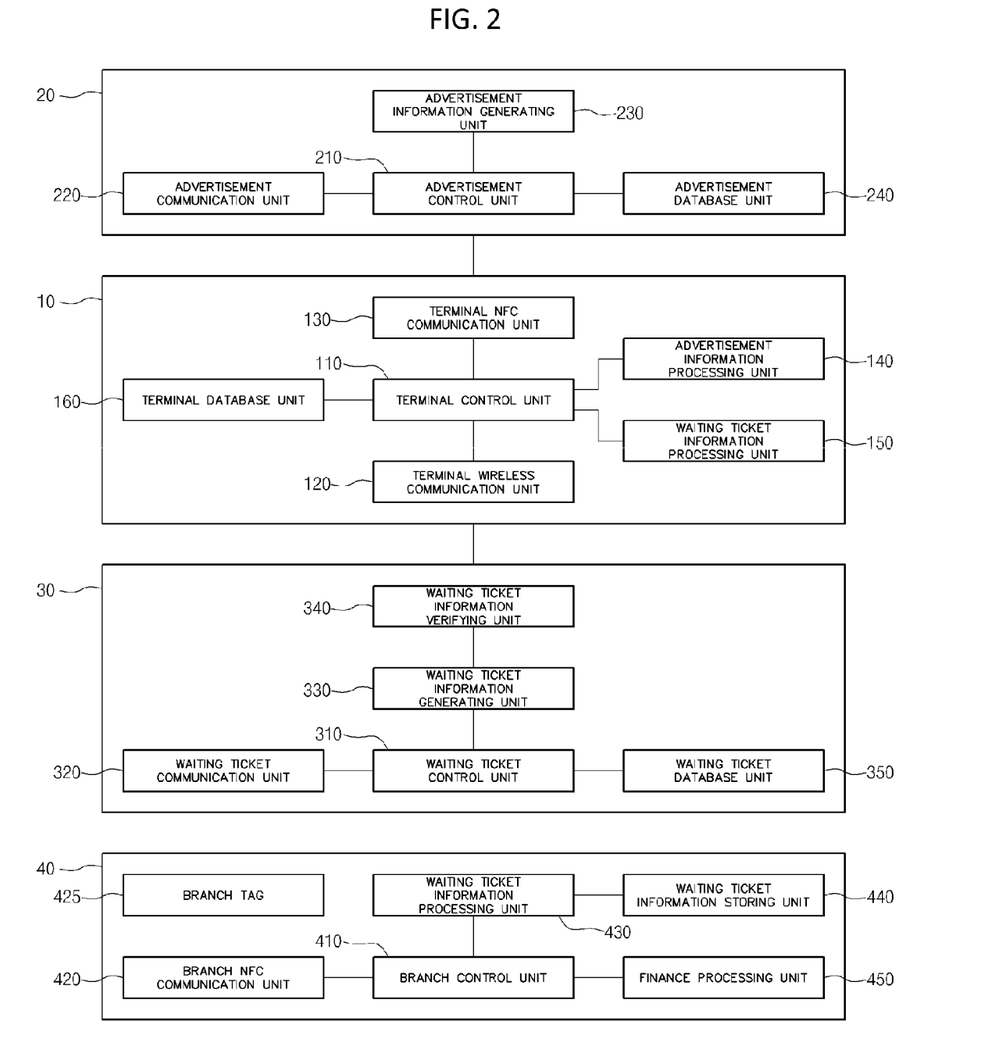
FIG. 2 is a detailed block diagram of the waiting ticket operation system according to one embodiment of the present invention.

FIG. 1 is a view illustrating a waiting ticket operation system according to one embodiment of the present invention, and FIG. 2 is a detailed block diagram of the waiting ticket operation system according to one embodiment of the present invention.

With respect to FIG. 1, a waiting ticket operation system, according to one embodiment of the present invention, may include: a user NFC terminal 10; an advertisement server 20, a waiting ticket server 30, and a smart branch 40.

Also, the advertisement server 20 and smart branch 40 may be separately or entirely included in the system depending on an operation method.

The user NFC terminal 10 may exchange information with the advertisement server 20, and the waiting ticket server 30, through a wireless communication network. The smart branch 40 mostly exchanges information via a NFC local area network method.

Hereinafter, detailed constitutive elements of each element in the system will be explained in detail with reference to FIG. 2.

The user NFC terminal 10 includes: a terminal control unit 110; a terminal wireless communication unit 120; a terminal NFC communication unit 130; an advertisement information processing unit 140; a waiting ticket information processing unit 150; and a terminal database unit 160.

The terminal control unit 110 may function to completely control each of the other elements and may also control the waiting ticket information and advertisement information to be output on a display screen of the user NFC terminal 10, when the waiting ticket information and the advertisement information are received from an external source.

The terminal control unit 110 may obtain positional information for locations where the user NFC terminal 10 is presently located, and may generate terminal information by using a unique serial number of the terminal, telephone connection number, the user's personal information, and the like, thereby enabling the terminal information to be provided externally.

The terminal wireless communication unit 120 may exchange information with an external communication terminal through a wireless communication network. For this exchange, the terminal wireless communication unit 120 may have a wireless communication interface including a wireless communication antenna and a wireless communication module.

The terminal wireless communication unit 120 may exchange waiting ticket information, terminal information, and advertisement information, with the advertisement server 20 and the waiting ticket server 30.

The terminal wireless communication unit 120 may receive information from a SMS or MMS signal through an OTA server and push information through a push server.

The terminal NFC communication unit 130 may exchange information with an external NFC terminal through an NFC communication network. For this exchange, the terminal NFC communication unit 130 may have an NFC communication interface including an NFC antenna and an NFC module.

The terminal NFC communication unit 130 may exchange waiting ticket information and terminal information with the smart branch 40.

The advertisement information processing unit 140 may extract advertisement data by analyzing the waiting advertisement information provided from the advertisement server, and may process the extracted advertisement data in a form that can be printed out on the user NFC terminal.

The waiting ticket information processing unit 150 may extract a waiting ticket by analyzing the waiting ticket information or the waiting advertisement information, transmitted from the waiting ticket server 30.

The waiting ticket information may be composed in an NDEF format and may be transmitted in combination with short text messages, multi-messages, or push messages that are transmitted through a wireless communication network.

The waiting ticket information processing unit 150 may extract and store the waiting ticket information of the NDEF format by analyzing the short text messages, multi-messages, or push messages transmitted through the wireless communication network, and may detect a waiting ticket stored in one area of an RTD. The waiting ticket may include application information sources of various types such as the issuing time of a waiting ticket, an issuing position, a business scope, and the like.

Also, separate authentication values for certifying that the waiting ticket information is valid may be stored in another area of the RTD.

The terminal database unit 160 may record and store advertisement information and waiting ticket information transmitted through the wireless communication network.

In order to retrieve the waiting ticket, the user NFC terminal 10 may obtain information that is connected to the waiting ticket server 30, and information in the smart branch 40, by tagging a branch tag 425, provided within the smart branch 40. The user NFC terminal 10 may also get the waiting ticket from the corresponding smart branch 40 by connecting to the waiting ticket server 30, depending on the type of information.

The advertisement server 20 includes an advertisement control unit 210, an advertisement communication unit 220, an advertisement information generating unit 230, and an advertisement database unit 240.

The advertisement control unit 210 may obtain the positional information of the terminal by analyzing terminal information. It may also provide the records of advertisement information generated according to the terminal information of the database by analyzing a serial number of the terminal, an access number, and the like.

The advertisement communication unit 220 has a communication interface that may exchange advertising information, waiting number information, or terminal information with the waiting ticket server 30, the smart branch 40, and the user's NFC terminal 10.

The advertisement information generating unit 230 may search and call positional information analyzed by the advertisement control unit 210, and the advertisement information corresponding to unique information of the terminal from the advertisement database unit 240.

The advertisement information generating unit 230 may generate waiting advertisement information, including waiting ticket information and advertisement information, transmitted from the waiting ticket server 30.

Advertisement data may be produced in a form in which a sound, vibration, and the like are added to static or moving images.

The waiting ticket server 30 includes a waiting ticket control unit 310, a waiting ticket communication unit 320, a waiting ticket information generating unit 330, a waiting ticket information verifying unit 340, and a waiting ticket database unit 350.

The waiting ticket control unit 310 may detect a serial number, access number, user information, and the like from the terminal by analyzing the terminal information of the user NFC terminal 10. It may also search the existing waiting ticket information corresponding to the detected terminal information from the waiting ticket database unit 150, and may provide updated waiting ticket information externally.

The waiting ticket communication unit 320 has a communication interface that may exchange advertisement information, waiting ticket information, or terminal information with the advertisement server 20, the smart branch 40, and the user NFC terminal 10.

The waiting ticket information generating unit 330 may sequentially issue a waiting number and update the issued waiting number. The waiting ticket server 30 is linked with a separate terminal that issues the waiting ticket offline, and updates the issued waiting ticket's position in numerical order by receiving information resulting from the termination of a previous waiting ticket holders' business affairs.

The waiting ticket information generating unit 330 may also add details of the terminal information analyzed in the waiting ticket control unit 310. For example, the waiting ticket information generating unit 330 generates waiting ticket information including both a unique serial number and waiting number of the user NFC terminal 10.

The waiting ticket information verifying unit 340 may verify whether the waiting ticket information of the user NFC terminal 10, transmitted from the smart branch 40, is waiting ticket information issued from the same terminal as the waiting ticket information issued in the waiting ticket information generating unit 330, or not.

The waiting ticket database unit 350 may record the issued waiting ticket and terminal information in that they may be consistent with each other.

The smart branch 40 may include a branch control unit 410, a branch NFC communication unit 420, a waiting ticket information processing unit 430, a waiting ticket information storing unit 440, a finance processing unit 450, and may further include a branch tag 425. The branch tag 425, which is an NFC tag, may include information that accesses the waiting ticket server 30 and information of the smart branch 40, and may provide relevant information to the user NFC terminal 10, depending on the tagging of the user NFC terminal 10. The user NFC terminal 10 may be issued a waiting ticket from the corresponding smart branch 40 by accessing the waiting ticket server 30, depending on information obtained from the branch tag 425.

The smart branch 40 may be provided in the form of a terminal device that enables the user to conduct financial business at a predetermined position such as an ATM of a bank. However, it does not necessarily need to have the form of the terminal device for financial business. If the form is linked with the waiting ticket server 30 in that updated waiting ticket information can be provided to the user NFC terminal 10, then that is deemed sufficient.

The branch control unit 410 may control each element of the smart branch 40 and may provide updated waiting ticket information to the user NFC terminal 10 by analyzing terminal information corresponding to analogous waiting ticket information.

The branch NFC communication unit 420, which is an element analogous to the terminal NFC communication unit 130 of the user NFC terminal 10, may have an NFC communication interface including an NFC antenna and an NFC communication module, for exchanging waiting ticket information and terminal information in an NFC local area network method.

The waiting ticket information processing unit 430 may request the waiting ticket server 30 to provide updated waiting ticket information corresponding to terminal information analyzed in the branch control unit 410.

The waiting ticket information processing unit 430 may also receive updated waiting ticket information, and transmit the updated waiting ticket information to the user NFC terminal 10.

The waiting ticket information storing unit 440 may record waiting ticket information, updated waiting ticket information, and terminal information processed in the branch control unit 410 and waiting ticket information processing unit 430.

The finance processing unit 450 may provide financial services with the exception of services providing waiting ticket information to the user linked with a separate financial server.

Figure 3:
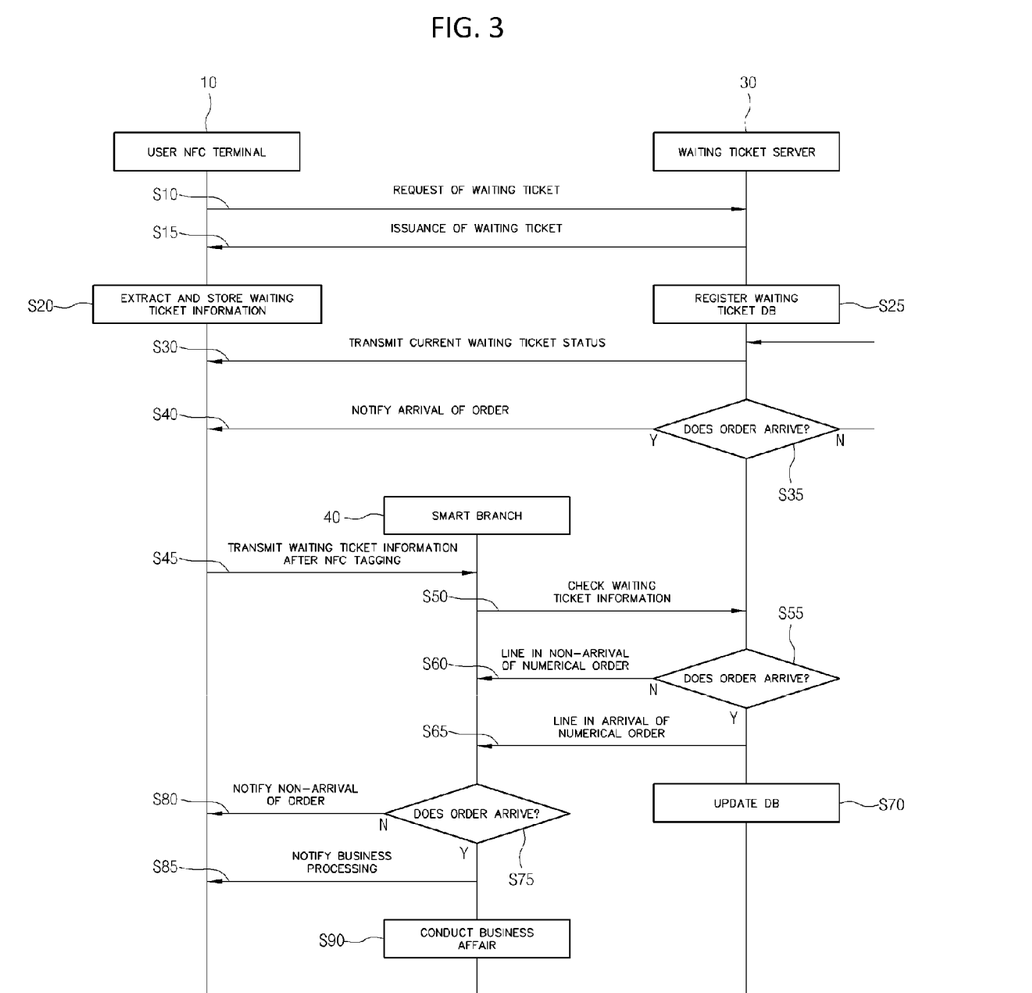
FIG. 3 is a flow chart showing a method of operating the waiting ticket system according to one embodiment of the present invention.

FIG. 3 is flow chart showing a method of operating the waiting ticket system according to one embodiment of the present invention.

The user NFC terminal 10 requests the waiting ticket server 30 to issue a waiting ticket, thereby enabling a waiting ticket to be issued (S10, S15).

The issuance of the waiting ticket is performed in such a manner that after accessing the waiting ticket server 30, using an application for the issuance of a waiting ticket, the user selects an institution for which the user wants a waiting ticket to be issued, and initiates the issuance of a waiting ticket by selecting a desired business affair.

Also, the user NFC terminal 10 may connect to the waiting ticket server 30 by obtaining access information from the waiting ticket server 30 and information from the smart branch 40, depending on the tagging of branch tag 425, and may request the waiting ticket server 30 to issue a waiting ticket from the corresponding smart branch 40.

The waiting ticket server 30 may issue a number for a waiting ticket in accordance with the time the user requires issuance of the waiting ticket, by checking information related to a waiting status in a corresponding institution, and may generate waiting ticket information, including terminal information, by requesting an expected total waiting time, waiting number, waiting ticket, and certified information. When effective waiting information is certified, transmission of a waiting ticket to the user NFC terminal is performed.

The waiting ticket information may be generated in an NDEF format, and the information related to the waiting ticket may be recorded and stored in an RTD space. The waiting ticket may also be transmitted through an OTA server or a push server. For these transmissions, the NDEF format waiting information may be combined with SMS or MMS information that uses an OTA server, or may be combined with push messages that use a push server.

After transmission, the user's NFC terminal 10 analyzes the received waiting ticket information and extracts the waiting ticket information in NDEF format, thereby storing it (S20).

General SMS messages commonly use a technology of separately parsing a text part and storing the text part. However, NDEF data may be generated such that a waiting number, waiting time, certified information, and the like, for waiting ticket information are included in the plurality of RTDs, thereby enabling efficient issuance of the waiting ticket.

After issuance the waiting ticket server 30 registers the issued waiting ticket information in the database of the waiting ticket server 30 so that the waiting ticket's position in numerical order can be updated, thereby enabling the waiting number for which the user employs to be updated, as business affairs are conducted at a corresponding institution (S25).

After updating, the waiting ticket server 30 transmits a status of the current waiting ticket to the user NFC terminal 10 and confirms whether or not the issued waiting ticket matches the waiting ticket's order, so that an updated status of the waiting ticket can be continuously transmitted through the OTA server or the push server, depending on a predetermined standard (S30, S35, S40).

Then the user having the user NFC terminal 10 may transmit the issued waiting ticket information in the NFC communication method to the smart branch 40 installed at a predetermined position (S45).

The user NFC terminal 10 may also transmit terminal information, including an access number and serial number for the terminal, user information, and the like to the smart branch 40.

Then the smart branch 40 checks updated information in the waiting ticket server 30 with regard to the waiting ticket information of the corresponding user NFC terminal 10 (S50).

Afterwards, with regard to the waiting ticket information requested to be checked, the waiting ticket server 30 analyzes whether or not the terminal information corresponds thereto, and whether or not the certified information is useful, thereby providing updated waiting ticket information when useful waiting ticket information is judged to be required (S55).

In the event where the waiting ticket's numerical order does not register, the waiting ticket server 30 provides information about the waiting ticket's numerical order not registering (S60), and in the event where the waiting ticket's numerical order registers, the waiting ticket server 30 provides information about the waiting ticket's numerical order registering (S65).

After this registering check, the waiting ticket server 30 updates waiting ticket information pertaining to whether or not the waiting ticket's numerical order registers and records the updated waiting ticket information in a database (S70).

After this database update, considering the updated waiting ticket information, the smart branch 40 judges whether or not the waiting ticket's numerical order requested by the user NFC terminal 10 has arrived (S75).

When a determination has been made whereby the waiting ticket's numerical order has not yet arrived, the updated waiting ticket information may be transmitted to the user NFC terminal 10 through an OTA server, a push server, or using an NFC communication method (S80).

Conversely, when a determination has been made whereby the waiting ticket's numerical order has arrived, the time for the user to conduct his or her desired affair is processed as having arrived, hence the user is then judged to have a right to conduct the business affair requested in step S10, thereby enabling the user to conduct his or her business affairs (i.e., at a business handling window) in a corresponding institution (S85, S90).

Figure 4:
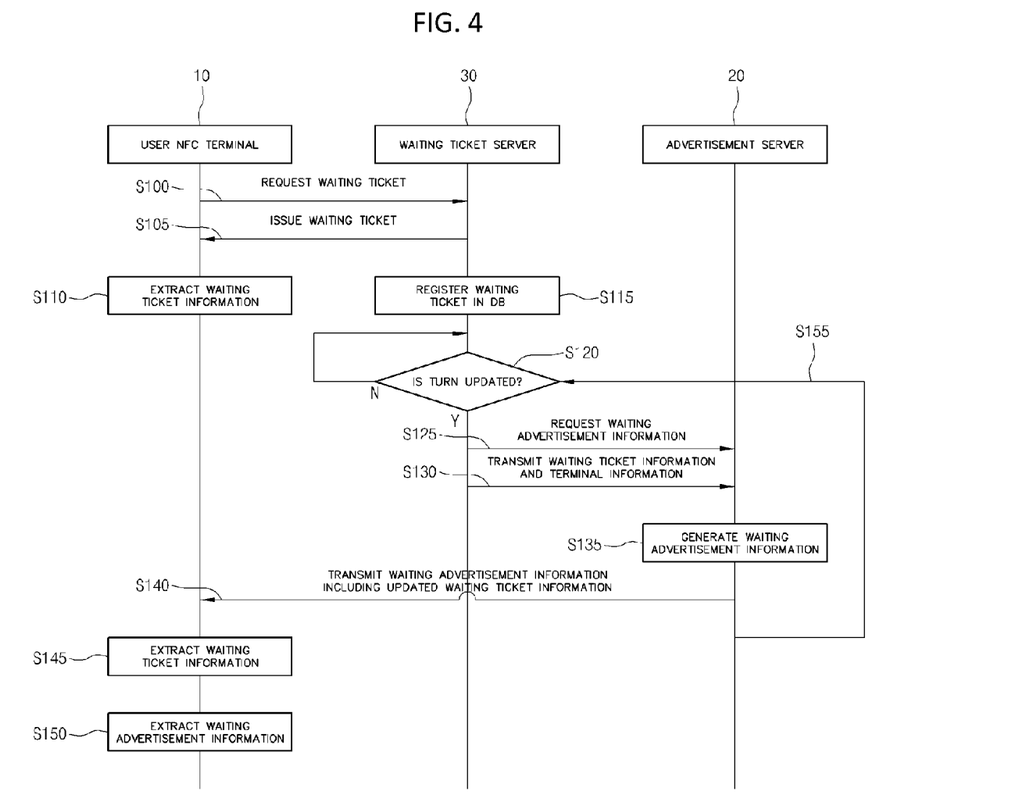
FIG. 4 is a flow chart showing a method of operating a waiting ticket system according to another embodiment of the present invention.

FIG. 4 is a flow chart showing a method of operating a waiting ticket system according to another embodiment of the present invention.

Since step S100 to step S115 are identical to step S10 to step S30 described in FIG. 3, a detailed description of steps S100 to S115 are omitted.

Afterwards, the waiting ticket server 30 judges whether or not the waiting ticket's position in numerical order is updated, and requests waiting advertisement information from the advertisement server 20 when the waiting ticket's position in numerical order is judged to be updated, thereby transmitting the updated waiting ticket information and terminal information of the user NFC terminal 10 to the advertisement server 20 (S120 S125, S130).

After transmission, the advertisement server 20 generates waiting advertisement information based on the updated and received waiting ticket information, and the analyzed terminal information (S135).

Preferably, the advertisement server 20 may generate waiting advertisement information by obtaining positional information and calling advertisement information corresponding to positional information.

After generating waiting advertisement information, the advertisement server 20 transmits the waiting advertisement information, including updated waiting ticket information, to the user NFC terminal 10 (S140). At this time, transmitted waiting advertisement information may be processed by the waiting ticket server 30, after it is transmitted from the advertisement server 20.

The waiting advertisement information may be transmitted to the user NFC terminal 10 through an OTA server or a push server.

After this transmission, the user NFC terminal 10 extracts waiting ticket information and waiting advertisement information by analyzing the received waiting advertisement information and waiting ticket information, and the waiting advertisement information is displayed on the user NFC terminal 10, thereby exposing the user to advertisements while confirming a waiting ticket status (S145, S150).

After this exposure to advertisements, the advertisement server 20 responds, depending on the transmission of advertisements (S155). Then the waiting ticket server 30 updates the stored waiting ticket information whenever the waiting ticket is updated. Additionally, as the waiting ticket's position in numerical order is updated, step S125 to step S150 may be repeated.

Figure 5:
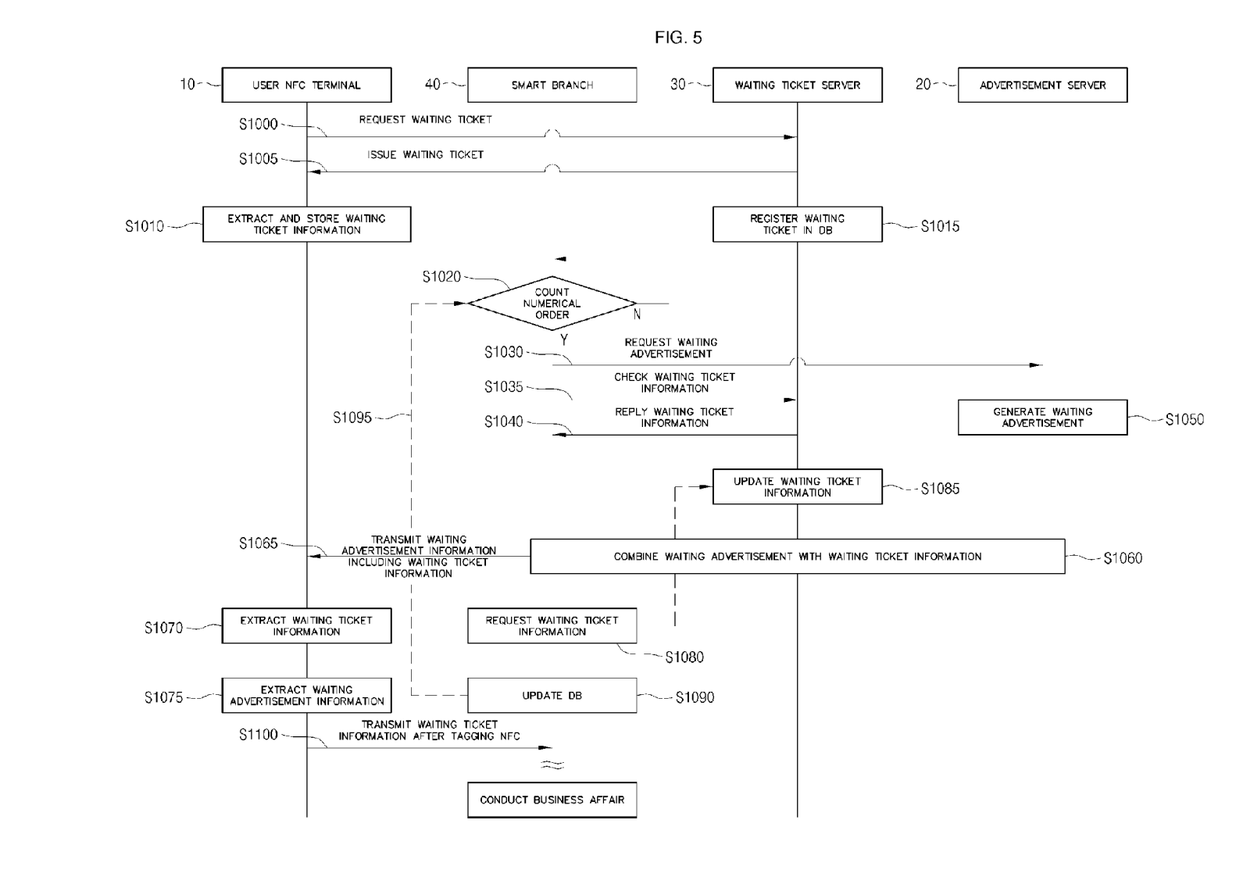
FIG. 5 is a flow chart showing a method of operating a waiting ticket system according to yet another embodiment of the present invention.

FIG. 5 is a flow chart showing a method of operating a waiting ticket system according to yet another embodiment of the present invention.

In one embodiment of FIG. 5, provided is a waiting ticket operation system including a user NFC terminal 10, an advertisement server 20, a waiting ticket server 30, and a smart branch 40. The embodiment of FIG. 5 is an embodiment in which the embodiments of FIG. 3 and FIG. 4 are complexly realized.

Since steps S1000 to S1015 are identical to steps S10 to S30 as described in FIG. 3, the detailed description of steps S1000 to S1015 are omitted.

After business affairs are conducted, depending on waiting ticket information, the waiting ticket's position in numerical order is counted. The smart branch 40 determines whether or not the waiting ticket information is counted in the user NFC terminal 10 (S1020), and requests the advertisement server 20, based on predetermined standard intervals, to provide a waiting advertisement whenever the position in the numerical order changes (S1030).

Afterwards, the smart branch 40 checks the newest information among waiting ticket information transmitted from the user NFC terminal 10 (S1035), in the waiting ticket server 30, and receives accompanying updated waiting information sent back from the waiting ticket server 30 (S1040).

Then, the advertisement server 20 analyzes terminal information from the user NFC terminal 10 and generates waiting advertisement information based on the analyzed terminal information (S1050).

Preferably, the advertisement server 20 may generate waiting advertisement information by obtaining positional information from terminal information and calling advertisement information corresponding to the positional information.

Afterwards, the advertisement server 20 combines updated waiting ticket information with waiting advertisement information from the waiting ticket server 30 (S1060), and transmits the combined information to the user NFC terminal 10 (S1065).

Depending on an operation mode, the combination of waiting ticket information with waiting advertisement information may be performed in the following ways: the advertisement server 20 requests the waiting ticket server 30 to provide waiting ticket information and subsequently receives the waiting ticket information. This, thereby generates waiting advertisement information including waiting ticket information by the combination of waiting advertisement and waiting ticket information; the waiting ticket server 30 receives a waiting advertisement from the advertisement server 20, thereby generating waiting advertisement information, including waiting ticket information; or the smart branch 40 gathers the newest waiting ticket information and waiting advertisement information, thereby generating waiting advertisement information including waiting ticket information.

The waiting advertisement information including waiting ticket information may be transmitted to the user NFC terminal 10 through an OTA server or a push server.

Then, the user NFC terminal 10 extracts the waiting ticket and waiting advertisement information by analyzing the received waiting advertisement information, and then waiting ticket and waiting advertisement information is displayed on the user NFC terminal 10, thereby exposing the user to advertisements while confirming a waiting ticket status (S1070, S1075).

Afterwards, the smart branch 40 requests the waiting ticket server 30 (S1080) to update the waiting ticket information (S1085), and then the waiting ticket server 30 updates the waiting ticket information (S1085).

The smart branch 40 updates the waiting ticket information stored in the database (S1090) and requests that the waiting ticket's position in numerical order is recounted (S1095).

Then, by passing through step S1020 to step S1090 again, the waiting advertisement information including waiting ticket information is transmitted to the user NFC terminal 10, at predetermined intervals, until the waiting ticket's numerical order, issued from the user NFC terminal 10 arrives, so that the waiting advertisement may be repeatedly exposed.

More specifically, when the user NFC terminal 10 transmits waiting ticket information transmitted from the waiting ticket server 30 to the smart branch 40, the smart branch requests the waiting ticket server 30 to check the updated waiting ticket information. Thus, the newest waiting ticket information generated from the waiting ticket server 30 and the waiting advertisement information generated from the advertisement server 20 are completely transmitted to the user NFC terminal 10, so that waiting ticket information and waiting advertisement information may be simultaneously exposed to the user NFC terminal 10.

Afterwards, in order to conduct financial business affairs once the waiting ticket's numerical order has been called, the user tags the user NFC terminal 10 (S1100) in identical fashion to the operations after the tagging step (S45) as illustrated in FIG. 3.

Having now described detailed exemplary embodiments of the invention, it should be apparent that modifications and variations can be made by a person(s) having ordinary skill in the art, without deviating from the spirit or scope of the described invention. Therefore, it is to be understood that the described embodiments are illustrative of the present invention and are not to be construed as limitations to the specific embodiments disclosed, and that modifications to the disclosed embodiments, as well as other embodiments, are intended to be included within the scope of the appended claims and their equivalents.

What is claimed is:

1. A waiting ticket operating system, comprising:
    a waiting ticket server configured:
        to receive, from a user NFC terminal, a waiting ticket request for a waiting ticket for a task,
        in response to the waiting ticket request, to generate waiting ticket information indicative of a waiting status for the task,
        to transmit waiting ticket information to the user NFC terminal,
        subsequently to transmit updated waiting ticket information indicative of an updated waiting status as the user NFC terminal's waiting status changes; and
    a smart branch connected with the waiting ticket server and configured:
        to receive, from the user NFC terminal, the waiting ticket information and terminal information from the user NFC terminal,
        to send, to the waiting ticket server, an update request for updated waiting ticket information for the user NFC terminal, the update request comprising the waiting ticket information from the user NFC terminal,
        subsequently to receive the updated waiting ticket information from the waiting ticket server,
        to forward the updated waiting ticket information to the user NFC terminal,
        to provide authority to carry out the task when it becomes the user NFC terminal's turn, and
    wherein, in response to the update request, the waiting ticket server is configured to verify the waiting ticket information received from the smart branch by determining whether the waiting ticket information is identical to the one issued to the user NFC terminal.

2. The system according to claim 1, wherein the user NFC terminal comprises:
    a waiting ticket information processing module configured to extract a waiting ticket from the waiting ticket information transmitted from the waiting ticket server and storing it in a terminal database; and
    a terminal control module configured to control displaying contents of the waiting ticket stored in the terminal database.

3. The system according to claim 1, wherein the waiting ticket server comprises:
    a waiting ticket generating module configured for sequentially issuing a waiting number and updating the issued waiting number;
    a waiting ticket information verifying module configured for confirming whether the waiting ticket information transmitted from the user NFC terminal to the smart branch is valid; and
    a waiting ticket controlling module configured for collecting the terminal information from the NFC terminal and analyzing it, then transmitting the updated waiting ticket information to the user NFC terminal corresponding to the terminal information.

4. The system according to claim 1, wherein the smart branch comprises;
    a finance processing module connected to a financial server configured to provide financial services;
    a waiting ticket information processing module configured for receiving the waiting ticket information and the terminal information transmitted from the user NFC terminal and further configured for requesting the updated waiting ticket information to the waiting ticket server; and
    a branch control module configured to forward the updated waiting ticket information to the user NFC terminal.

5. The system according to claim 4, wherein the smart branch further comprises a branch tag configured for storing smart branch information, wherein the smart branch information is provided to the user NFC terminal upon tagging of the branch tag by the user NFC terminal.

6. A waiting ticket operating system, comprising:
a waiting ticket server configured:
- for generating waiting ticket information indicative of a waiting status in response to a user NFC terminal's request,
- for transmitting updated waiting ticket information indicative of an updated waiting status to the user NFC terminal as the waiting status is updated over time, and
- for requesting a waiting advertisement content, wherein requesting the waiting advertisement comprises transmitting the updated waiting ticket information and terminal information of the user NFC terminal; and an advertisement server configured:
- for receiving the updated waiting ticket information and the terminal information from the waiting ticket server,
- for generating the waiting advertisement content including the updated waiting ticket information and advertisement information, and
- for transmitting the waiting advertisement content to the user NFC terminal.

7. The system according to claim 6, wherein the user NFC terminal comprises:
an advertisement information processing module configured for extracting advertisement information from the waiting advertisement content and configured for processing the advertisement information; and
a waiting ticket information processing module configured for extracting the waiting status from the waiting ticket information or the waiting advertisement content.

8. The system according to claim 6, wherein the waiting ticket server comprises;
a waiting ticket information generating module configured for sequentially issuing a waiting number and updating the issued waiting number; and
a waiting ticket controlling module configured for collecting the terminal information from the user NFC terminal and analyzing it, and further configured for transmitting the updated waiting ticket information and the terminal information to the advertisement server.

9. The system according to claim 6, wherein the advertisement server comprises:
an advertisement control module configured for obtaining locational information indicative of a location of the user NFC terminal; and
an advertisement information generating module configured for searching for advertisement information corresponding to the location of the user NFC terminal from the advertisement database and further configured for generating the waiting advertisement content including the updated waiting ticket information and the advertisement information.

10. A waiting ticket operation system, comprising:
a waiting ticket server configured
in response to a user NFC terminal's request, for generating and transmitting waiting ticket information to the user NFC terminal, wherein the waiting ticket information indicative of a waiting status for a task, and
subsequently for transmitting, to the user NFC terminal, updated waiting ticket information indicative of an updated waiting status as the user NFC terminal's waiting status changes;

a smart branch configured:
- for receiving waiting ticket information and terminal information from the user NFC terminal, wherein the terminal information identifies the user NFC terminal,
- for requesting the waiting ticket server for updated waiting ticket information of the user NFC terminal, wherein requesting for updated waiting information comprises providing the waiting ticket information to the waiting ticket server, and
- for providing authority to carry out the task when it becomes the user NFC terminal's turn; and an advertisement server configured:
- for receiving the updated waiting ticket information and the terminal information of the user NFC terminal from the waiting ticket server,
- for generating the waiting advertisement content including the updated waiting ticket information and advertisement information, and
- for transmitting the generated waiting advertisement content to the user NFC terminal, wherein the waiting ticket server is configured to determine whether the waiting ticket information from the smart branch is identical to the waiting ticket information issued to the user NFC terminal.

11. The system according to claim 10, wherein the user NFC terminal comprises:
an advertisement information processing module configured for extracting advertisement information from the waiting advertisement content and configured for processing the advertisement information; and
a waiting ticket information processing module configured for extracting the waiting status from the waiting ticket information or the waiting advertisement content.

12. The system according to claim 10, wherein the waiting ticket server comprises:
a waiting ticket information generating module configured for sequentially issuing a waiting number and updating the issued waiting number;
a waiting ticket information verifying unit for determining whether the waiting ticket information transmitted from the smart branch is valid; and
a waiting ticket control module configured for collecting the terminal information from the user NFC terminal and analyzing it, and further configured for transmitting the updated waiting ticket information and the terminal information to the advertisement server.

13. The system according to claim 10, wherein the smart branch comprises:
a finance processing module linked with a separate financial server configured to provide financial services; and
a waiting ticket information processing module configured for receiving the waiting ticket information and the terminal information transmitted from the user NFC terminal and further configured for providing the terminal information to the waiting ticket server.

14. The system according to claim 10, wherein the advertisement server comprises:
an advertisement control module configured for analyzing positional information of the user NFC terminal from the terminal information; and
an advertisement information generating module configured for searching, in an advertisement database, for advertisement information corresponding to the positional information and further configured for generating the waiting advertisement content including the updated waiting ticket information and the advertisement information.

15. A waiting ticket operation method, comprising:
a step in which a waiting ticket server receives, from a user NFC terminal, a request to issue a waiting ticket for a task;
a step which the waiting ticket server transmits, to the user NFC terminal, the waiting ticket information in response to the request from the user NFC terminal;
a step in which a smart branch receives, from the user NFC terminal, the waiting ticket information and terminal information;
a step in which the smart branch requests to the waiting ticket server for updated waiting ticket information corresponding to the terminal information;
a step in which the smart branch provides the updated waiting ticket information to the user NFC terminal; and
a step in which the smart branch provides the user NFC terminal with authority to carry out the task when it becomes the user terminal's turn.

16. A waiting ticket operation method, comprising:
a step in which a waiting ticket server receives, from a user NFC terminal, a request to issue a waiting ticket for a task; and
a step which the waiting ticket server generates waiting ticket information in response to the request and transmits the waiting ticket information to the user NFC terminal, wherein the waiting ticket information indicates a waiting status of the user NFC terminal;
a step in which the waiting status of the user NFC terminal changes and is updated in the waiting ticket server;
a step which the waiting ticket server transmits updated waiting ticket information and terminal information of the user NFC terminal to an advertisement server, and the waiting ticket server requests the advertisement server to transmit a waiting advertisement content to the user NFC terminal, wherein the updated waiting ticket information indicates an updated waiting status of the user NFC terminal; and
a step in which the advertisement server generates the waiting advertisement content including the updated waiting ticket information and advertisement information and the advertisement server transmits the generated waiting advertisement content to the user NFC terminal such that
the user NFC terminal can process the waiting advertisement content and display the updated waiting ticket information and advertisement information.

17. The method according to claim 16, further comprising:
a step in which the advertisement server generates and transmits the waiting advertisement content to the user NFC terminal;
a step in which the advertisement server analyzes the terminal information and retrieves therefrom positional information of the user NFC terminal;
a step in which the advertisement server locates, in an advertisement database, advertisement information corresponding to the position information and the advertisement server generates the waiting advertisement content comprising the located advertisement information.

18. A waiting ticket operation method, comprising:
a step in which a waiting ticket server receives, from a user NFC terminal, a request to issue a waiting ticket about a task; and
a step which the waiting ticket server transmits the waiting ticket information in response to the request resulting from the request to the user NFC terminal;
a step which a smart branch receives, from the user NFC terminal, the waiting ticket information and terminal information about the user NFC terminal;
a step in which the smart branch requests the waiting ticket server to check updated waiting ticket information corresponding to the terminal information;
a step in which the waiting ticket server transmits the updated waiting ticket information and the terminal information of the user NFC terminal to an advertisement server, and the waiting ticket server requests the advertisement server to transmit waiting advertisement content;
a step in which the advertisement server generates the waiting advertisement content including the updated waiting ticket information and advertisement information, and the advertisement server transmits the waiting advertisement content to the user NFC terminal such that
the user NFC terminal processes the waiting advertisement content and displays the updated waiting ticket information and the advertisement information; and
a step which the smart branch provides authority to the user NFC terminal to carry out the task when it becomes the user NFC terminal's turn.

* * * * *